(No Model.)

D. CROWELL, Jr.
SAIL HANK AND HOOK.

No. 300,226. Patented June 10, 1884.

Witnesses.
Thacher T. Hallet
George P. Matthews

Inventor.
David Crowell Jr.
by Chas. F. Sleeper, Atty.

N. PETERS. Photo-Lithographer, Washington, D. C.

UNITED STATES PATENT OFFICE.

DAVID CROWELL, JR., OF YARMOUTH PORT, ASSIGNOR TO ALBERT F. EDSON, OF BARNSTABLE, AND FREDERICK C. SWIFT, OF YARMOUTH, MASSACHUSETTS, TRUSTEES.

SAIL HANK AND HOOK.

SPECIFICATION forming part of Letters Patent No. 300,226, dated June 10, 1884.

Application filed April 26, 1883. (No model.)

*To all whom it may concern:*

Be it known that I, DAVID CROWELL, Jr., a citizen of the United States, residing at Yarmouth Port, in the county of Barnstable and State of Massachusetts, have invented a new and useful Improvement in Hanks and Hooks, of which the following is a specification.

My invention relates especially to devices for fastening the hinged parts of hanks and hooks used on shipboard after they have been placed in the positions for which they are designed, such devices being attached to the hank or hook and readily operated to loosen or fasten the parts. I attain these objects by means of the devices shown in the accompanying drawings, in which—

Figure 6:
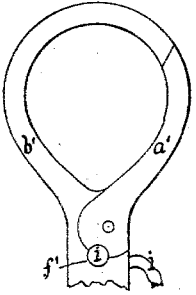
Figure 7:
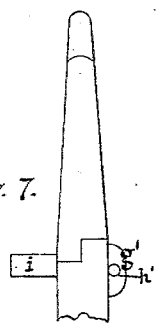

Figures 1, 2, 3, 4, and 5 are different views of a hank. Figs. 6 and 7 represent one form of hook, and Figs. 8 and 9 another form of hook.

Figure 1:
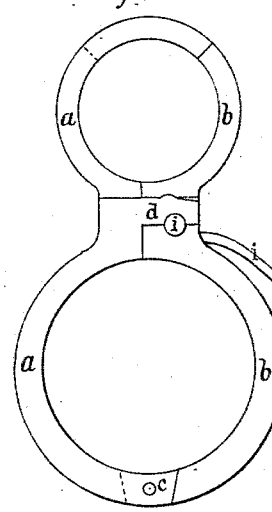

The parts of the hank $a$ and $b$ are hinged together at $c$ in the usual manner. A stud, $d$, from the part $a$ fits in a channel, $e$, Fig. 2, in the part $b$ when the hank is closed, as shown in Fig. 1. Through the stud $d$ and the part $b$ a hole, $f$, is bored, one half of the hole being cut on the stud and the other half on the side of the channel $e$, as shown. On the rear of the part $b$ is a rib, $g$, through which is a hole, $h$, of a smaller size than the hole $f$, and which I prefer to place beneath the center of the hole $f$.

Figure 2:
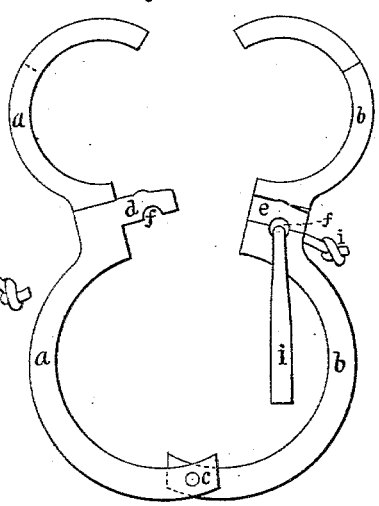
Figure 3:
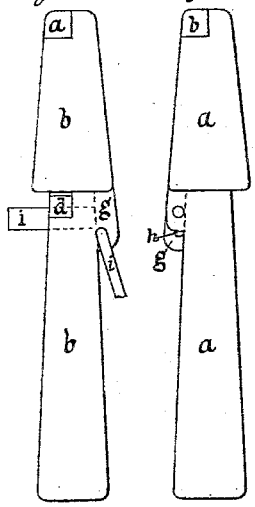
Figure 4:
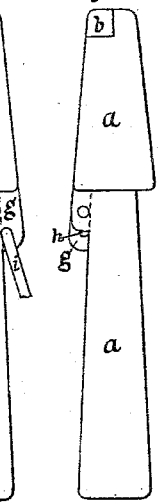
Figure 5:
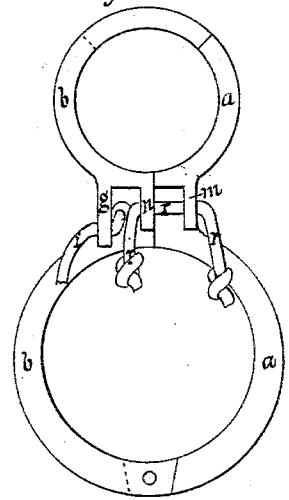

Having thus prepared the parts of the hank, I provide a thong, $i$, preferably of rawhide or sole-leather, made large at one end to fill the hole $f$, and small at the other to fit the hole $h$. The thong is passed through the holes $f$ and $h$, and a knot tied in it, as shown, to prevent it from pulling out. When the parts are separated, as shown in Fig. 2, the small portion of the thong $i$ lies in the lower part of the hole $f$, and the stud $d$ can be closed over it into the channel $e$ without touching it. When thus closed, the large end of the thong is drawn into the hole $f$, locking the parts together, as shown in Figs. 1 and 3. A pull on the large end of the thong releases the lock and allows the parts to be separated.

In Figs. 6 and 7 I have shown a hook, $b'$, having a hinged arm, $a'$, with a hole, $f'$, through the hook and forming a recess in the arm, and having also a perforated rib, $g'$, with the thong $i$, operating in the holes to lock the arm to the hook.

Figure 8:
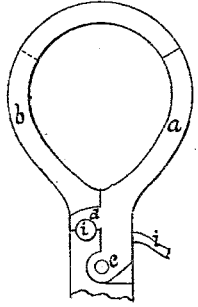
Figure 9:
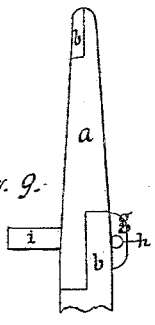

In Figs. 8 and 9 I have shown clip-hooks (or sister-hooks) as in the hank; but the parts $a$ and $b$ are locked together without the intervention of a loop or ring between the hinge $c$ and the locking device.

It is sometimes desirable to prevent a hank, when open, from falling from the stay or mast on which it has been placed. I have therefore shown in Fig. 5 two ribs, $m$ and $n$, one upon the part $a$ and the other upon the part $b$. After the hank has been placed in position upon the stay, a cord, $r$, is passed through the ribs and knotted at each end, allowing the necessary play for the sister-hooks to embrace the leach of the sail, but preventing the hank from leaving the stay.

If desired, the rib $n$ may be omitted and the cord $r$ passed through the rib $g$.

The hooks shown in Figs. 6, 7, 8, and 9 may be attached to mast hoops, eyes, or bolts in a usual manner.

The large end of the thong may be cased with metal, as in tags for shoe-strings, if desired.

The stud $d$ may be used with a mortise in the part $b$, or the upper wall of the channel $e$ may be omitted.

What I claim as my invention is—

1. The combination, with two pivoted or hinged parts, of a thong operating to fasten the said parts together by entering and filling a hole, one portion of which hole is formed upon one of said parts, and one portion upon the other part, all substantially as described.

2. In combination with two pivoted or hinged parts, a thong made larger at one end than the other, the small end fitting a hole in one of the parts, and the large end a hole formed partly upon each of said parts, all substantially as described.

3. In a hinged hank, a cord, $r$, loosely connecting the two parts of said hank after it has been placed upon the stay, substantially as described.

DAVID CROWELL, JR.

Witnesses:
E. W. HALLETT,
WILLIAM J. DAVIS.